Figure 1:
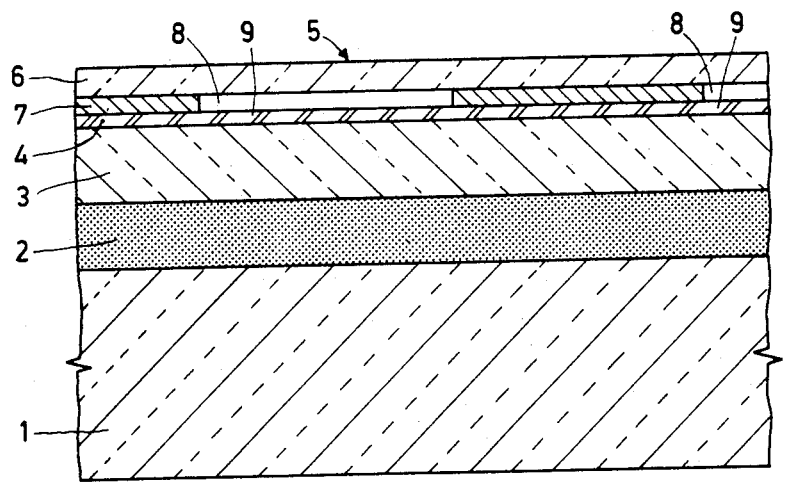

United States Patent [19]

Peeters et al.

[11] Patent Number: 4,493,887
[45] Date of Patent: Jan. 15, 1985

[54] OPTICAL RECORDING ELEMENT

[75] Inventors: Winfried L. Peeters; Johannes J. Ponjeé; Jan W. D. Martens, all of Eindhoven, Netherlands

[73] Assignee: U.S. Philips Corporation, New York, N.Y.

[21] Appl. No.: 458,124

[22] Filed: Jan. 14, 1983

[30] Foreign Application Priority Data

Nov. 5, 1982 [NL] Netherlands ............... 8204291

[51] Int. Cl.³ .................. G03C 1/495; G03C 1/80
[52] U.S. Cl. ............................. 430/275; 430/271;
430/945; 346/76 L; 346/135.1; 428/432;
428/446; 428/698
[58] Field of Search ............... 430/271, 275, 321, 324,
430/945; 428/432, 446, 698; 358/345, 347;
346/135.1, 76 L, 137; 365/122

[56] References Cited

U.S. PATENT DOCUMENTS

| 4,268,840 | 5/1981 | Schank et al. | 346/135.1 |
| 4,387,381 | 6/1983 | Bell | 346/135.1 |
| 4,403,231 | 9/1983 | Ando et al. | 346/135.1 |
| 4,423,427 | 12/1983 | Kaiser | 346/135.1 |

FOREIGN PATENT DOCUMENTS

| 8050693 | 10/1980 | Netherlands . |
| 2002338 | 2/1979 | United Kingdom . |
| 2081537 | 2/1982 | United Kingdom . |

OTHER PUBLICATIONS

Chida et al., IEEE Transactions on Magnetics, vol. Mag-13, No. 3, (May 1977), pp. 982-988.

Primary Examiner—Mary F. Downey
Assistant Examiner—José G. Dees
Attorney, Agent, or Firm—Norman N. Spain

[57] ABSTRACT

Optical recording element comprising a transparent supporting plate which on one side has successively a recording layer of preferably a ferrite, an optional transparent intermediate layer and a reflecting optical structure of reflection areas which are situated alternately at a high level and at a lower level and which can be read optically.

9 Claims, 2 Drawing Figures

OPTICAL RECORDING ELEMENT

The invention relates to an optical recording element comprising a transparent supporting plate which on one side has a recording layer and a reflecting optical structure of reflection areas which are situated alternately at a higher level and at a lower level and which can be read optically, in which the optical structure comprises a layer of synthetic resin having a spiral-like groove or a groove built up from concentric circles, and a reflection layer provided over the whole surface of the layer of synthetic resin.

Such an element is known from published Netherlands Patent Application No. 8 005 0693 (PHN 9861) in the name of Applicants. The known recording element comprises a transparent supporting plate of, for example, glass which is provided on one side with a light-cured lacquer layer which comprises an optically readable information track of information areas situated alternately at a higher level and at a lower level. The layer of lacquer is coated over the whole surface with a recording layer which has a reflecting capacity with respect to the laser light with which the information track is read. Information is recorded in the recording layer by means of comparatively energy-rich laser light. The recorded information (bits) can be read by means of laser light. The disadvantage of the element is that the recording layer has to be provided at a low temperature. The lacquer layer carrying the information track is very sensitive to temperature. At high temperatures of more than, for example, 200° C., or in particular more than 400° C., the information track or even the whole layer of lacquer is deformed or attacked. So it is necessary when providing the recording layer that the temperature of the layer of lacquer does not increase to too high a value. It has been found in practice that in general sputtered layers or vapour-deposited layers of, for example, metals, metal alloys, chalcogenic substances and the like do not attack or deform the layer of lacquer. The choice of the material of the recording layer, however, is restricted.

In the above-mentioned known recording element the recording layer also serves as a reflection layer of the reflecting optical structure. The recording layer must have adequate reflecting capacity with respect to laser light, at the expense of the absorption of laser light in said layer. As a result of this the efficiency of recording information, that is to say the formation of information bits in the recording layer, is reduced.

It is the object of the invention to provide an optical recording element which does not exhibit the above-mentioned disadvantages and is particularly suitable for use of recording layers which are provided at a high temperature.

This object is achieved by means of a recording element of the above-mentioned type which is characterized in that the recording layer is provided between the transparent supporting plate and the reflecting optical structure, the reflection layer of the reflecting optical structure being present on the surface of the above-mentioned layer of synthetic resin remote from the recording layer.

In the recording element according to the invention the recording layer does not serve as a reflection layer of the optical structure. Thus the recording layer is independent of the reflecting optical structure.

In this connection reference is made to British Patent Application No. 2,081,537 published on Feb. 17, 1982. From this Patent Application a magneto-optical element is known which has a transparent substrate plate which on one side comprises successively a magneto-optical recording layer, a transparent dielectric layer and a reflection layer. The reflection layer is not provided over the whole surface of the dielectric layer but in the form of tracks which are separated by tracks which do not have a reflection layer. The element belongs to a type different from that of the present invention. For example, the element known from the above-mentioned British Patent Application, in contrast with the element according to the invention, does not have a reflecting optical structure of reflection areas situated at a higher level and at a lower level. The reflection areas of the element according to the British Patent Application are situated at the same level. Moreover, the reflecting optical structure in the element according to the invention has a layer of synthetic resin which comprises a groove and has a metal layer over the whole surface; whereas according to the British Patent Application the reflection tracks are separated from each other and are embedded in an adhesive. The element according to the British Patent Application has the disadvantage that in the areas of the recording layer in which the information is recorded, the reflection is higher than in the so-called guide track areas so that the efficiency of recording is not deemed to be optimum. Furthermore, according to the British Patent Application a maximum Kerr rotation effect is achieved of approximately 0.5°, while a Kerr rotation of 3° can be reached by means of the element according to the invention.

The optical structure of the element according to the invention comprises information for the control of the laser light with which information is recorded in the recording layer. The optical structure is read in reflection via the substrate and the recording layer, reading being based on differences in amplitude between the reflected laser light originating from the reflection areas at a higher level and that of the reflection areas at a lower level. Due to the level difference, reading on the basis of differences in phase of the reflected laser light is also possible. The reading laser light is so weak that no recording of information takes places in the recording layer.

The recording layer may be, for example, a layer of a metal or a metal alloy or a layer of a chalcogenide, for example, a layer on the basis of a tellurium and/or selenium alloy.

By exposure to energy-rich laser light, a change (information bit) is produced in the layer in the exposed and consequently heated sites which afterwards can be traced by means of weak laser light. Such a change is, for example, the formation of a hole or cavity. When an amorphous ferromagnetic material is used, a variation in the magnetic properties is induced.

In a favourable embodiment of the element according to the invention the recording layer is a layer of an inorganic oxide. A layer of an inorganic oxide is provided at a high temperature of the supporting plate, for example at a temperature of 500° C. The supporting plate must be capable of withstanding said temperature and is preferably manufactured from glass or quartz.

In a further favourable embodiment a magneto-optical layer of an inorganic oxide is used as a recording layer. A very suitable layer is a layer of a ferrite, in particular cobalt ferrite. A readily useful cobalt ferrite satisfies the formula $CoFe_2O_4$. When such magnetizable oxides are used in the element in accordance with the invention, high values of the Kerr rotation angle are obtained and consequently an excellent signal-to-noise ratio of the information bits written in the recording layer.

A magneto-optical layer of an inorganic oxide, in particular a ferrite, is known per se from Netherlands Patent Application No. 7,708,959 (PHN 8863) in the name of Applicants. Upon exposure to energy-rich laser light the temperature of the ferrite layer, which is magnetized, for example, in a direction perpendicular to the layer, will rise and the direction of magnetization in the exposed sites will vary. The Kerr rotation angle is a measure of the provided variation which can be read by means of polarized weak laser light. When a cobalt ferrite layer is used in the element in accordance with the invention a Kerr rotation angle of approximately 3° is obtained.

A layer of an inorganic oxide, for example, cobalt ferrite, is manufactured by spraying a solution of salts of the metals (Fe, Co) in an organic salt and/or water on the heated substrate. The solvent then evaporates on the hot substrate and the salts decompose while forming cobalt ferrite. A suitable starting material is a solution of cobalt acetyl acetonate and ferri-acetyl acetonate in propanol. Dependent on the composition of the solution, the Co-Fe ratio in the crystal lattice of the formed cobalt ferrite changes. The formation of cobalt ferrite takes place at a temperature of approximately 500° C.

In a preferred embodiment of the optical recording element in accordance with the invention the recording layer of ferrite forms an antireflex coating for the reflection layer at the area of the groove in the layer of synthetic resin.

In that part of the recording layer which is coated by the reflection areas of lower level, hence at the area of the groove, an antireflection condition prevails, which means that the laser light incident on the element and the laser light emanating from the element as a result of reflection against the reflection areas of lower level, extinguish each other for a considerable part, for example 80%. Due to both the absorbing character and the transparent character of a ferrite an anti-reflex condition can be obtained by a correct choice of the layer thickness which is matched to the optical constants of the further materials of the element, such as supporting plate and reflecting optical structure. With a glass supporting plate and an Ag reflection layer the thickness of a $CoFe_2O_4$ layer is 0.21 μm.

At the location of the reflection areas of higher level the recording element in accordance with the invention does not show an antireflex condition. As a result of this an excellent signal-to-noise ratio is obtained both upon reading the reflecting optical structure and upon reading the information bits in the recording layer. Furthermore, the quantity of laser light energy necessary for writing information in the recording layer is minimum in the above-mentioned preferred embodiment.

In a further preferred embodiment of the optical recording element in accordance with the invention a transparent intermediate layer is provided between the recording layer and the reflecting optical structure, the recording layer together with the intermediate layer forming an antireflection coating for the reflection layer of the optical structure at the area of the groove in the layer of synthetic resin of the optical structure.

By choosing the thickness of both the recording layer and the transparent intermediate layer in accordance with the value of the optical constants, such as refractive indes, of the other layers of the recording element, the antireflex situation is adjusted. In case a ferrite layer is used as a recording layer which as such satisfies the condition of antireflection, the transparent intermediate layer may not disturb the condition of antireflection and the thickness of the intermediate layer must be equal to N. ($\lambda/2n$), there N is an integer, $\lambda$ is the wavelength of the laser light used and n is the refractive index.

For the conditions of antireflection in an assembly of layers which comprise an absorbing layer, a transparent layer and a reflecting layer, in which the absorbing layer and the transparent layer form an antireflex coating for the reflecting layer, reference may be made to A. E. Bell and F. M. Spong, Antireflection Structures for Optical Recording, IEEE Journal of Quantum Electronics, Vol. Q.E. 14, No. 7, July, 1978, pp. 487-495.

In still another preferred embodiment of the recording element in accordance with the invention in which the above-mentioned antireflex situation can be achieved efficiently, the groove present in the layer of synthetic resin of the optical structure extends over the whole thickness of the layer of synthetic resin. No material of the layer of synthetic resin is present any more between the groove and the underlying layer, either the transparent intermediate layer or the recording layer. In this connection it is to be noted that also in the presence of material of the synthetic resin layer between the bottom of the groove and the underlying layer, the recording element in accordance with the invention can show an antireflex condition at the location of the reflection areas of lower level (at the area of the groove). However, in that case the thickness of the remaining layer of synthetic resin must be accurately adjusted, which is less attractive in a practical respect.

An optical recording element in accordance with the invention which is particularly suitable for practical application, comprises a supporting plate of glass which on one side comprises successively a layer of cobalt ferrite, a transparent intermediate layer, a layer of a photoresist having a groove extending over the whole thickness of the photoresist layer and a metal reflecting layer provided over the photoresist layer with groove.

Figure 2:
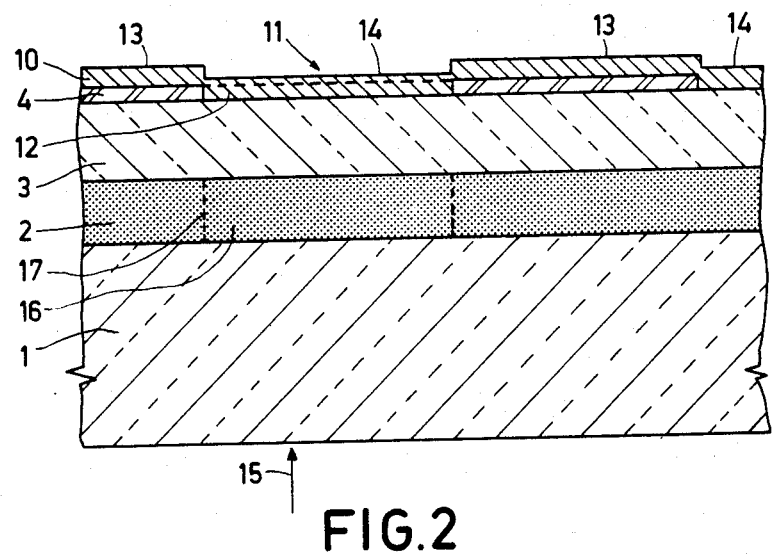

The invention will be described in greater detail with reference to the drawing, in which:

FIG. 1 is a cross-sectional view of a recording element according to the invention during the manufacture, FIG. 2 is a cross-sectional view of the recording element obtained after the manufacture.

Reference numeral 1 in FIG. 1 denotes a transparent supporting plate which is preferably manufactured from glass or quartz and has a thickness of 1.2 mm. The supporting plate is provided on one side with a recording layer 2 of $CoFe_2O_4$. For this purpose the supporting plate is heated at 500° C. and a solution of ferri-acetylacetonate and cobaltacetylacetonate in propanol is then sprayed over the surface of the supporting plate. After evaporating the solvent and decomposing the salt, a layer of $CoFe_2O_4$ is obtained in a layer thickness of 0.21 μm. A transparent intermediate layer 3 is provided on the recording layer 2. The intermediate layer may be of a synthetic resin. An intermediate layer of synthetic resin is provided by spraying a solution of the synthetic resin in an inorganic solvent over the surface of the recording layer 2 and evaporating the solvent. The intermediate layer 3 in the embodiment shown in the Figure is a sputtered SiO₂ layer in a thickness of 0.26 μm.

A layer 4 of a positive photoresist material which after drying has a thickness of 70 mm is provided on the intermediate layer 3. Photoresist layer 4 is coated with a chromium mask 5, known as LRC (low reflectant chromium) mask, which consists of a glass plate 6 and a chromium layer 7 which is provided thereon and which comprises recesses 8. The recesses form a spiral-like groove or a groove consisting of concentric circles.

Photoresist layer 4 is exposed to UV—light via the mask 5. The mask is removed and the photoresist layer 4 is developed, the exposed parts 9 of the photoresist layer which correspond to the recesses 8 in the chromium layer 7 going into solution. It is also possible to expose the photoresist layer directly, so without the use of a mask, to UV-light which is modulated in accordance with the information to be written. Hence a direct exposure in the form of a pattern succeeded by the development step. Finally, the developed photoresist layer is provided with a metal layer 10 (FIG. 2) of, for example, Ag, Al, Cu. A good metal layer is notably an Ag-layer. The resulting optical recording element is shown in FIG. 2 in which the same reference numerals are used as in FIG. 1. The optical structure present in the element is referenced 11. This structure consists of a photoresist layer 4 which has the above-mentioned groove 12 in a groove depth which is equal to the thickness of the photoresist layer 4. The whole surface of the photoresist layer 4 with groove 12 is coated with the metal layer 10 so that the structure 11 comprises alternately reflection areas of higher level 13 and reflection areas of lower level 14. The optical structure 11 is read in reflection by means of weak laser light which is focused on the optical structure in the direction denoted by the arrow 15. At the location of the reflection areas at lower level 14 the element shows an antireflection condition, that is to say that the laser light incident on the element and the laser light emanating from the element as a result of reflection against the reflection areas 14 extinguish each other for a considerable part. At the location of the reflection area at higher level 13 such an antireflection does not exist. As a result of this the optical structure shows an excellent signal-to-noise ratio upon reading. Information is recorded in the recording layer 2 namely in the area 16 present between the broken lines 17. This area is covered by the reflection area of low level 14 via intermediate layer 2. In this part of the element, as mentioned above, an antireflection condition prevails, or in other words there is an optical resonant cavity. The information is recorded by focusing energy-rich laser light in the direction of the arrow 15 on the recording layer so that in the exposed places the Kerr rotation of the magnetic material changes sign.

Upon recording in the area 16 of recording layer 2 an optimal signal-to-noise ratio is obtained having a Kerr rotation of 3°.

What is claimed is:

1. A optical recording element comprising a transparent supporting plate, a recording layer situated on one surface of said supporting plate, an optically readable reflecting optical structure comprising reflection areas situated alternately at a higher level and a lower level situated on the same side of said supporting plate as said recording layer, said optical structure comprising a layer of synthetic resin, containing a spiral-like groove or a groove built up from concentric circles, and a reflection layer provided over the entire surface of said synthetic resin layer, characterized in that the recorded layer is situated between the transparent supporting plate and the optically readable reflecting optical structure and the reflection layer of the reflecting optical structure is situated of said synthetic resin layer remote from the recording layer.

2. An optical recording element as claimed in claim 1, characterized in that the recording layer is a layer of an inorganic oxide.

3. An optical recording element as claimed in claim 2, characterized in that the recording layer is a magneto-optical layer of an inorganic oxide.

4. An optical recording element as claimed in claim 3, characterized in that the recording layer comprises a ferrite.

5. An optical recording element as claimed in claim 4, characterized in that the recording layer forms an antireflex coating for the reflection layer at the area of the groove in the layer of synthetic resin.

6. An optical recording element as claimed in claim 1, characterized in that a transparent intermediate layer is provided between the recording layer and the reflecting optical structure, the recording layer and the intermediate layer together forming an antireflex coating for the reflection layer at the area of the groove in the layer of synthetic resin.

7. An optical recording element as claimed in claim 5, characterized in that the groove extends over the whole thickness of the layer of synthetic resin.

8. An optical recording element as claimed in claim 7, characterized in that the element comprises a glass supporting plate which on one side comprises successively a layer of cobalt ferrite, a transparent intermediate layer, a layer of a photoresist having a groove extending over the whole thickness of the photoresist layer and a reflecting layer of metal provided over the photoresist layer with groove.

9. An optical recording element as claimed in claim 6, characterized in that the groove extends over the whole thickness of the layer of synthetic resin.

* * * * *